United States Patent [19]
Lee

[11] Patent Number: 6,140,786
[45] Date of Patent: Oct. 31, 2000

[54] METHOD FOR CONTROLLING A TEMPERATURE OF AN ELECTRIC MOTOR

[75] Inventor: Myoung-sool Lee, Kyonggi-do, Rep. of Korea

[73] Assignee: SamSung Electronics Co., Ltd., Suwon, Rep. of Korea

[21] Appl. No.: 09/201,149

[22] Filed: Nov. 30, 1998

[30] Foreign Application Priority Data

Nov. 29, 1997 [KR] Rep. of Korea ..................... 97-64481

[51] Int. Cl.[7] ................................ G05B 5/00; H04N 1/21
[52] U.S. Cl. .................... 318/471; 318/472; 318/783; 361/25; 347/153; 358/296
[58] Field of Search .................. 318/471, 472, 318/434, 783; 361/23–29, 103–106, 271; 346/153.1, 160; 358/296, 300; 347/139, 140

[56] References Cited

U.S. PATENT DOCUMENTS 3,809,960  5/1974  Josic ....................... 317/13 B
4,357,565  11/1982  Saito et al. .................. 318/473
5,644,510  7/1997  Weir ............................ 364/557

*Primary Examiner*—Paul Ip
*Assistant Examiner*—Marlon Fletcher
*Attorney, Agent, or Firm*—Robert E. Bushnell, Esq.

[57] ABSTRACT

Disclosed is a method for controlling a temperature of an electric motor. According to the present invention, the method for controlling the temperature of the electric motor includes the steps of setting a present temperature of the electric motor as an initial value, comparing the present temperature with a lower limit temperature when the multifunctional apparatus receives an order to perform a printing, performing the printing if the present temperature is lower than the lower limit temperature at the comparing step, converting a time for printing into an increased value of the temperature at the performing step and resetting the increased value of the temperature as the present temperature, and delaying the printing for a predetermined time if the present temperature is higher than the lower limit temperature at the comparing step.

18 Claims, 5 Drawing Sheets

METHOD FOR CONTROLLING A TEMPERATURE OF AN ELECTRIC MOTOR

CLAIM OF PRIORITY

This application makes reference to, incorporates the same herein, and claims all benefits accruing under 35 U.S.C. §119 from an application for A METHOD FOR CONTROLLING A TEMPERATURE OF AN ELECTRIC MOTOR earlier filed in the Korean Industrial Property Office on Nov. 29, 1997 and there duly assigned Serial No. 64481/1997.

BACKGROUND OF THE INVENTION

1. Field of the Invention

The present invention relates to a method for controlling the temperature of an electric motor, and more particularly to a method for controlling a temperature of an electric motor used in a multifunctional office apparatus.

2. Description of the Prior Art

Generally, various types of electric motors are essential components of electronic appliances, office automation apparatus, and other apparatus for varius applications. In particular, a multifunctional apparatus having a line scanner, a line printer, and related components which are integrated with one another contains a plurality of electric motors and generally such an apparatus has the characteristic of holding the temperature at the inner portion of the apparatus in a predetermined range of temperature. In recent times, electronic appliances and office automation apparatus incorporate high performance semiconductor elements and electric/electronic elements to improve the accuracy of the apparatus. Since the semiconductor elements and the electric/electronic elements are sensitive to temperature, the temperature may have an effect on the accuracy of the electronic and the office automation apparatus. That is, if the temperature increases over a specific temperature in the electronic apparatus and the office automation apparatus, the elements may malfunction or may be destroyed due to the high temperature.

As an electric motor rotates at a high velocity, a high temperature is generated by the electric motor which has an effect on the electric motor and peripheral elements. Accordingly, the accuracy of the electric motor and the peripheral elements may be degraded. In order to hold the temperature of the electric motor and the peripheral elements in a predetermined range in the electronic appliance or the office automation apparatus, it has been proposed that a heat sink be mounted in the electronic appliance or the office automation apparatus to radiate the heat generated. Another proposal is that a temperature sensor be mounted inside the appliance to control the temperature in the electronic appliance or the office automation apparatus by controlling electric current supplied to the electric motor.

According to the conventional art as described above, however, such a heat sink or temperature sensor mounted in the electronic appliance or the office automation apparatus would substantially increase the manufacturing cost of the electronic appliance or the office automation apparatus. Furthermore, the method of controlling the electric current supplied to the electric motor to prevent the temperature of the electric motor from increasing may result in the motor not generating a torque, resulting in degradation of the reliance of the products.

Based on my observation of the art, then, I have found that what is needed is a method for controlling the temperature of a motor in an appliance which does not require a heat sink or a temperature sensor on the motor. Moreover, this method for controlling the temperature must not interfere with the operation of the motor such as to lead to loss of reliance of the appliance.

SUMMARY OF THE INVENTION

It is therefore an object of the present invention to provide an improved office electronic apparatus.

It is also an object of the present invention to provide a method for controlling an electric motor in an office electronic apparatus.

It is a further object of the present invention to provide a method for controlling an electric motor which avoids use of a heat sink on the motor.

It is a still further object to provide a method for controlling the temperature of an electric motor which avoids loss of torque.

It is a yet further object to provide a method for controlling the temperature of an electric motor which avoids degradation in the performance of the electronic apparatus.

The present invention has been made to overcome the above described problem of the conventional art. The present invention provides a method for controlling a temperature of an electric motor in a multifunctional apparatus, in which a driving time and a resting time of the electric motor are converted and controlled into an upper limit temperature and a lower limit temperature, resulting in preventing the temperature of the electric motor from increasing over a predetermined value.

To accomplish the above objects of the present invention, there is provided a method for controlling a temperature of an electric motor including the steps of setting a present temperature of the electric motor as an initial value; comparing the present temperature of the motor with a lower limit temperature when an order to perform a printing is received; performing the printing if the present temperature is lower than the lower limit temperature at the comparing step; converting a time for printing into an increased value of the temperature at the performing step and resetting the increased value of the temperature as the present temperature, that is, determining the increased value of the motor temperature based on the time for the printing; and delaying the printing for a predetermined time if the present temperature is higher than the lower limit temperature at the comparing step. These steps are repeatedly carried out every time for printing a paper of data. The initial value may be set using a measured experimental value for a temperature in a room in which the printing is performed. The method uses a value of a difference between an upper limit temperature and a lower limit temperature, this difference being larger than the temperature increase during the printing of a paper of data. The predetermined time includes a minimum time that the present temperature is decreased to the lower limit temperature.

The method for controlling the temperature of the electric motor according to the present invention further includes the steps of: comparing the present temperature with the initial value if the order for performing the printing is not received, after the present temperature is set as the initial value; and holding a mode of stopping the printing until the present temperature is lower than the initial value if the present temperature is larger than the initial value at the initial value comparing step.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
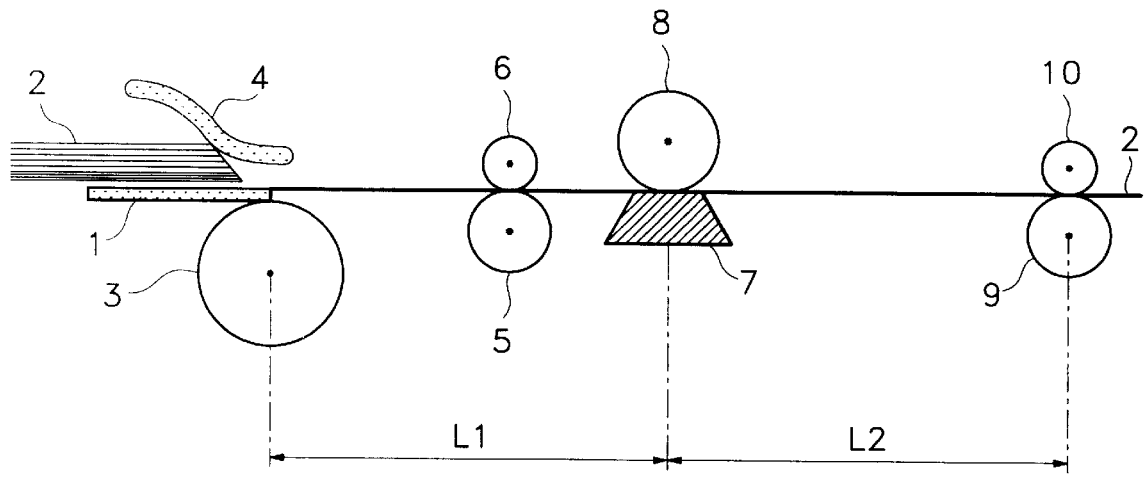
FIG. 1 is a schematic view of an inner construction of a multifunctional apparatus according to the present invention.

Hereinafter, a method for controlling a temperature of an electric motor in a multifunctional apparatus according to the present invention will be described in detail with reference to accompanying drawings. FIG. 1 is a schematic view of an inner construction of a multifunctional apparatus according to the present invention. As shown in FIG. 1, the multifunctional apparatus according to the present invention includes a line scanner (not shown) and a line printer. With respect to the invention, the line scanner operates in the same manner as the line printer. Therefore, the method according to the present invention will be described with respect to the line printer.

Referring to FIG. 1, a plurality of papers which are contained in tray 1 are picked up by means of pickup roller 3 and frictional pad 4 one by one and conveyed along a pathway of the paper which is already set. When paper 2 is conveyed by pickup roller 3 and a leading edge of the paper 2 approaches driving roller 5, pickup roller 3 stops a rotation and first idle roller 6 makes the paper 2 to come into close contact with driving roller 5. Paper 2 is continuously conveyed by a frictional force between driving roller 5 as driving roller 5 rotates. Then, when paper 2 passes between printer head 7 and printing head supporting roller 8, printer head 7 prints a predetermined image on paper 2. When the terminal edge of paper 2 passes between discharging roller 9 and second idle roller 10, the printing of the image on paper 2 is completed.

Figure 2:
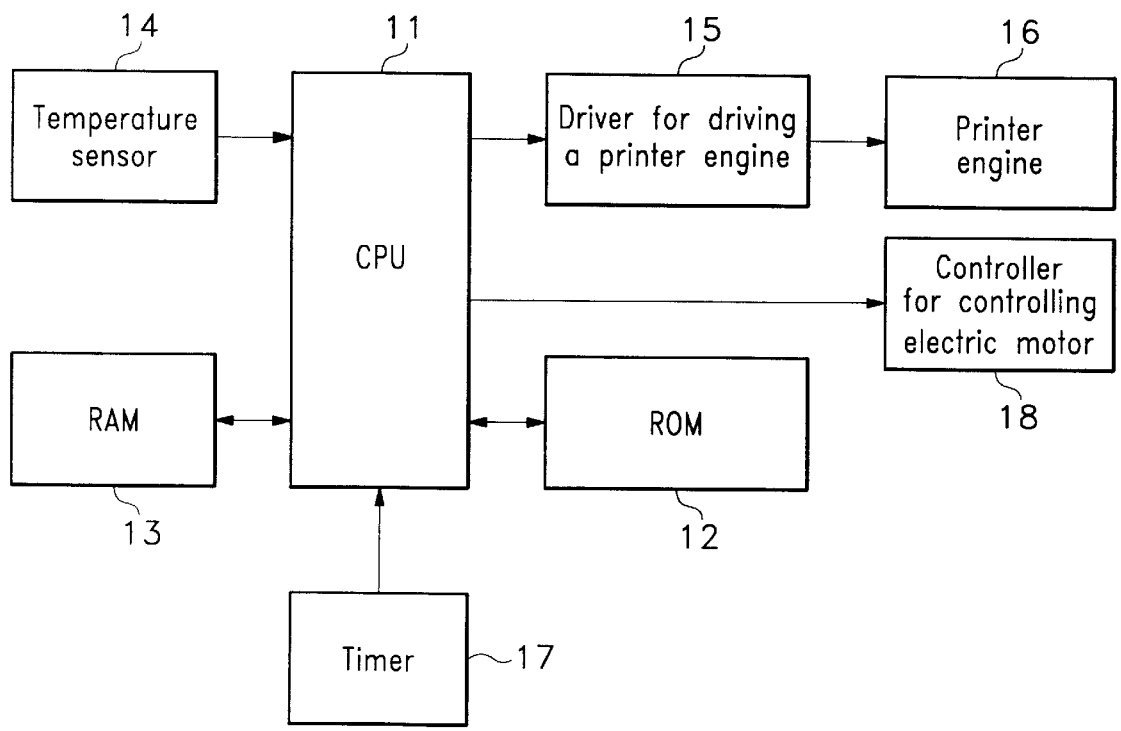
FIG. 2 is a schematic block diagram showing a printer according to the present invention.

FIG. 2 is a schematic block diagram of a printer according to the present invention. As shown in FIG. 2, CPU 11 controls the printer overall according to a predetermined program. ROM 12 has a control program for performing operations of the printer and a calculating program for controlling a motor according to a temperature of the motor. RAM 13 has various data, for examples calculated results and time, which are obtained in controlling the temperature of the motor. Temperature sensor 14 detects and provides a room temperature in the printer for CPU 11. Driving section 15 of printer engine 16 controls printer engine 16 according to a control signal of CPU 11. Timer 17 counts information for time and provides the information for time for CPU 11 when CPU 11 requires the information for time. Motor controlling section 18 controls motors mounted in the printer. At this time, motor controlling section 18 generates a pulse signal having a predetermined duty ratio to control the motor according to the control signal of CPU 11.

In the case when a length of paper 2 is $L_0$ mm and a conveying velocity of paper 2 is $V_s$ mm/sec, a total conveying distance L of paper 2 and a time $\Delta t_r$ for printing image on a paper can be calculated as following formulas.

$$L = L_0 + L_1 + L_2 [mm] \quad \text{Formula 1.}$$

$$\Delta t_r = L/V_s [sec] \quad \text{Formula 2.}$$

where the $L_1$ is a distance from pickup roller 3 to printer head 7 and the $L_2$ is a distance from printer head 7 to discharging roller 9 (see FIG. 1).

Figure 3A:
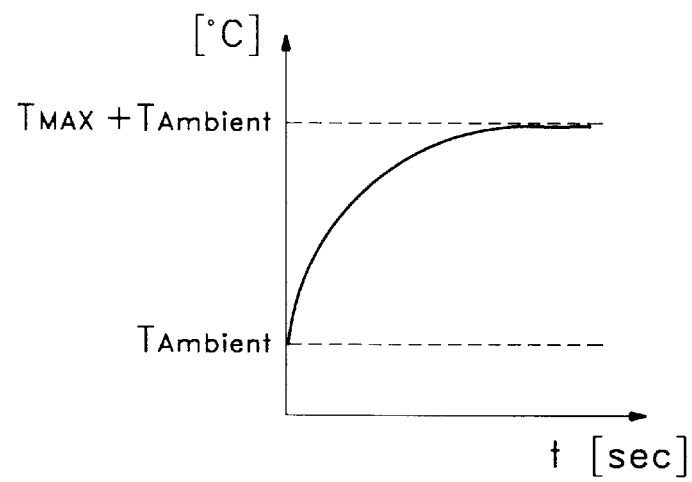
FIG. 3A is a graph showing the increase in temperature of an operating electric motor in a conventional multifunctional apparatus.
Figure 3B:
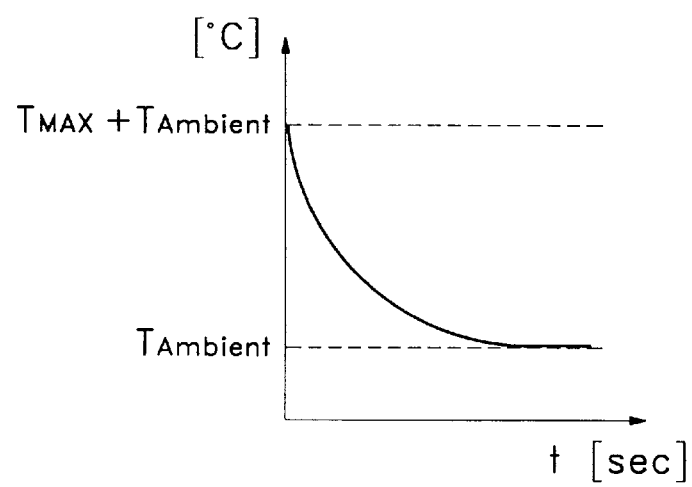
FIG. 3B is a graph showing the decrease in temperature of a resting electric motor in a conventional multifunctional apparatus.

If the printing of image on a paper is continuously repeated, the temperature of the electric motor and peripheral elements adjacent to the electric motor may increase to a critical temperature at which the electric motor and adjacent elements of the printer start to malfunction. FIGS. 3A and 3B respectively are graphs showing the temperature increasing characteristic and the temperature decreasing characteristic of an electric motor in a multifunctional apparatus. Functions of the temperature for the time are respectively expressed as following formulas.

$$T_{increased}(t) = T_{max} \times (1 - e^{-t/\tau_r}) + T_{ambient} \quad \text{Formula 3.}$$

$$T_{decreased}(t) = T_{max} \times (1 - e^{-t/\tau_f}) + T_{ambient} \quad \text{Formula 4.}$$

wherein $T_{increased}$ (t) is the temperature for the temperature increase of FIG. 3; $T_{decreased}$ (t) is the temperature for the temperature decrease of FIG. 4; $T_{max}$ is a maximum temperature increase from room temperature, $T_{ambient}$, when the electric motor is operated under the duty rate of 100%, (that is, $T_{max}$ is the change in temperature from ambient to where the temperature is saturated and levels off); and $\tau_r$ and $\tau_f$ are integral numbers when the temperature is increased or decreased, respectively. The values of $T_{max}$, the $T_{ambient}$, $\tau_r$, and $\tau_f$ may vary according to the characteristic of factors such as a mechanical construction and the electric source, and these values may be obtained by experiment.

Figure 4:
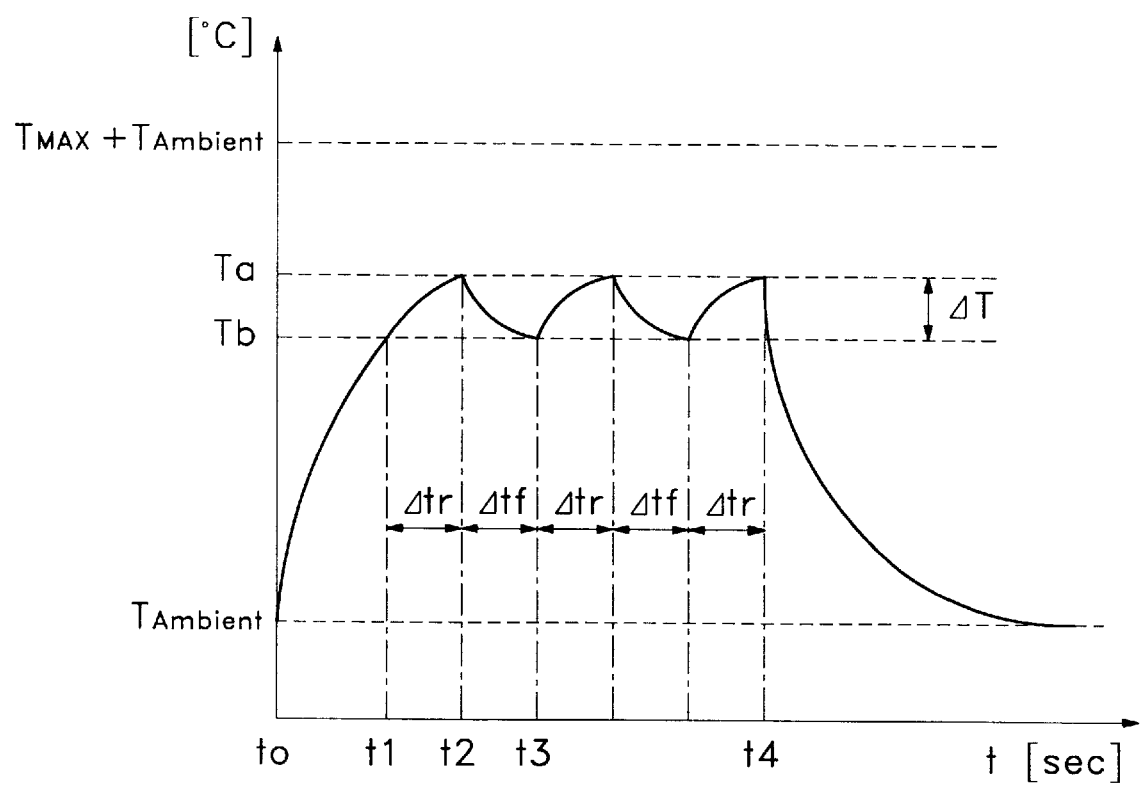
FIG. 4 is a graph showing a temperature characteristic versus time of an electric motor in a multifunctional apparatus according to the present invention, where Ta is an upper limit temperature and Tb is a lower limit temperature.

FIG. 4 is a graph showing temperature of the electric motor versus time in a multifunctional apparatus according to the present invention, when an upper limit temperature is set as Ta and a lower limit temperature is set as Tb. The electric motor is operated from starting time-point $t_0$ to time-point $t_2$ at which the temperature of the electric motor approaches the upper limit temperature Ta with the motor operating at a duty rate of 100% generated by motor controlling section 18. Operation of the electric motor is stopped for time period $\Delta t_f$ at the point $t_2$ at which the temperature of the electric motor approaches the upper limit temperature, Ta, in order to decrease the temperature of the motor to temperature Tb before printing an image on a paper. The electric motor operates to perform this image printing at time-point $t_3$ and the temperature of the electric motor increases from Th to Ta. The above operations are repeatedly performed between $t_3$ and $t_4$ to prevent the temperature of the electric motor from increasing over upper limit temperature Ta.

Timer 17 measures the time for which the electric motor is stopped after the finishing time-point $t_4$ at which the printing is completed and the CPU converts the time into the temperature, that is, the CPU determines the present temperature for the electric motor based on the time. Therefore, the multifunctional apparatus can determine and hold the information for the present temperature of the motor.

Hereinafter, a manner for calculating the resting time $\Delta t_r$ and the duty of a pulse for a cycle of printing a paper will be described. When the present temperature of the electric motor is between upper limit temperature Ta and lower limit temperature Tb, the temperature of the electric motor is decreased to the lower limit temperature before a cycle of printing a paper. Accordingly, the decrease of the temperature, $\Delta T$, is calculated as follows:

$$\Delta T = Ta - Tb \quad \text{Formula 5.}$$

The Ta is calculated as follows:

$$Ta = T_{max} \times (1 - e^{-t2/\tau r}) + T_{ambient} \quad \text{Formula 6.}$$

The $t_1$ is expressed as follows:

$$t_1 = t_2 - \Delta t_r \quad \text{Formula 7.}$$

The Tb is expressed as follows:

$$Tb = T_{max} \times (1 - e^{-(t1 - \Delta tr)/\tau r}) + T_{ambient} \quad \text{Formula 8.}$$

Furthermore, the value of $\Delta t_f$ required to achieve the decrease in temperature $\Delta T$ can be obtained by using the temperature decreasing characteristic in FIG. 3B. The present temperature decreases from the upper limit temperature Ta. Therefore, a stating time-point $t_s$ is expressed as follows:

$$t_s = -\tau_r \times \ln\{(Ta - T_{ambient})/T_{max}\} \quad \text{Formula 9.}$$

A finishing time-point $t_e$ at which the present temperature approaches the lower limit temperature Tb is expressed as follows:

$$t_e = -\tau_r \times \ln\{(Tb - T_{ambient})/T_{max}\} \quad \text{Formula 10.}$$

A time necessary for decreasing the present temperature is calculated as follows:

$$\Delta t_f = t_e - t_s \quad \text{Formula 11.}$$

Time $t_3$ is expressed as follows:

$$t_3 = t_2 + \Delta t_f \quad \text{Formula 12.}$$

When the cycle of printing is completed at time $t_3$, the temperature of the electric motor has become Ta. Even if the electric motor is continuously operated in the manner as described above, the temperature of the electric motor can not increase over Ta. Accordingly, timer 17 measures the resting time from time-point $t_4$ at which the operation of the electric motor is completed, and CPU 11 converts the resting time into the temperature value, that is, determines the temperature value from the resting time, in the same manner as desribed above.

The duty indicates the percentage of time for which the temperature of the electric motor increases during the cycles of printing the image on a paper. The duty is 100% when the electric motor operates from time-point $t_0$ to $t_1$. When the electric motor operates from $t_1$ to $t_4$, the duty is calculated as follows:

$$D_{t1-t4} = 100 \times \{\Delta t_r/(\Delta t_r + \Delta t_f)\}[\%] \quad \text{Formula 13.}$$

After the electric motor is in a rest for a predetermined time and then the cycle of the printing the image on a paper is performed, the electric motor is operated at a duty of 100% when the temperature of the electric motor is lower than temperature Ta.

Figure 5:
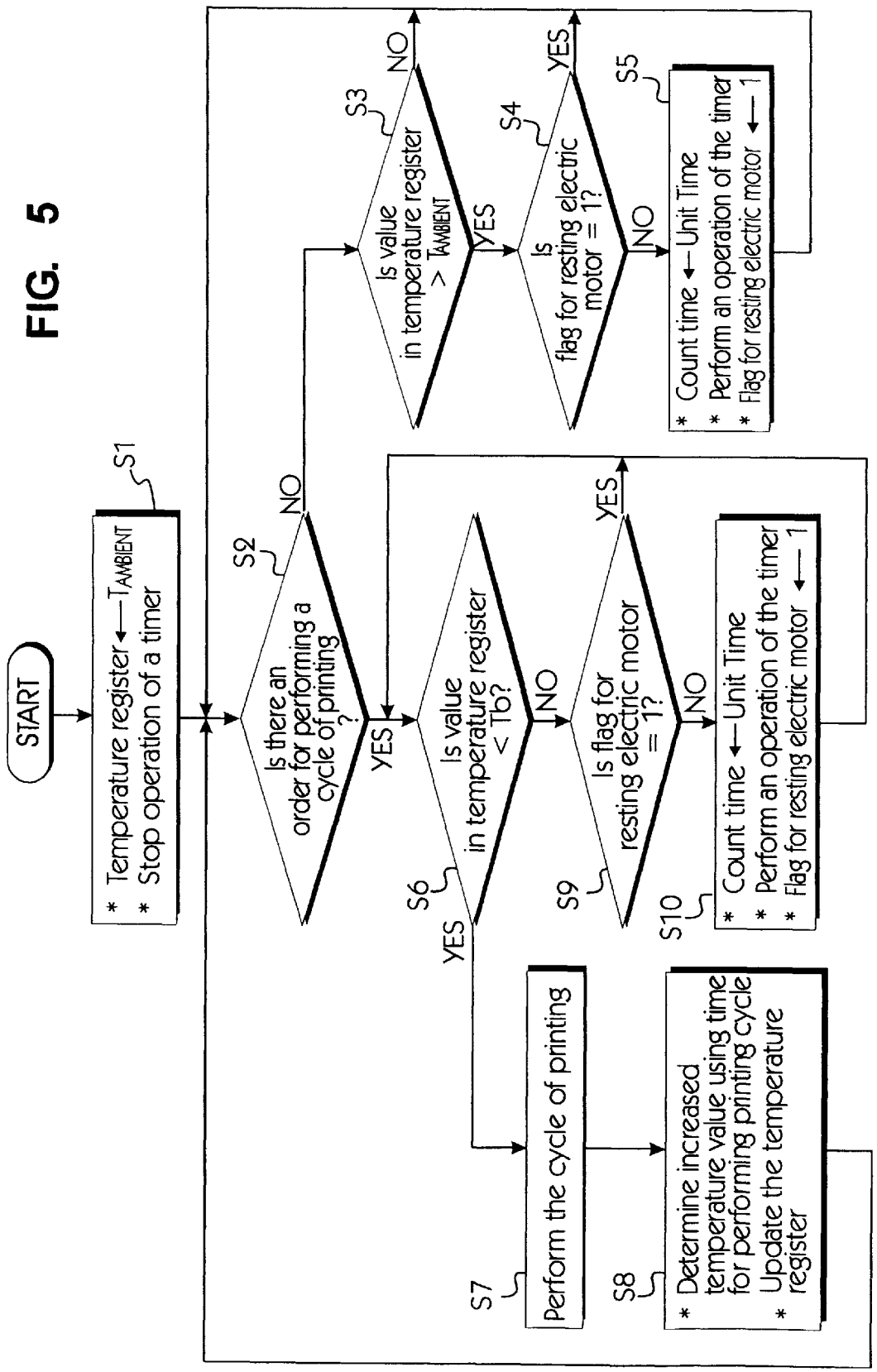
FIG. 5 is a flow chart showing a process of controlling the temperature of the electric motor according to the present invention.

FIG. 5 is a flow chart showing a process of controlling the temperature of the electric motor according to the present invention. When the printer is operated, initial value $T_{ambient}$ is stored in a temperature register and an interrupt request is made of timer 17 to stop timing, at step S1. Then, CPU 11 checks at step S2 whether an order for performing a cycle of printing the image on a paper is received by CPU 11. At step S2, if the order for performing the cycle of printing the image on the paper is not received by CPU 11, the electric motor is in the resting state, and does not operate. Therefore, the present temperature and the initial value stored in the temperature register are checked and the present temperature is compared with the initial value, at step S3.

If it is determined that the present temperature stored in the temperature register is lower than the initial value $T_{ambient}$ at step S3, step S2 is performed to check the order for printing the image on the paper. If it is determined that the present temperature stored in the temperature register is equal to or larger than the initial value $T_{ambient}$, a flag indicating the resting of the electric motor is checked in order to determine whether the process of resting the operation of the electric motor is being performed, at step S4.

At step S4, if the flag indicating the resting of the electric motor has a value of one, it means that the process of resting the operation of the electric motor is being performed. Therefore, step S2 is performed again. If the flag indicating the resting of the electric motor is not equal to one, timer 17 transfers an interrupt request to CPU 11. According to the interrupt request of timer 17, CPU 11 sets the flag indicating the resting of the electric motor to one, at step S5. Unit time means a period for updating temperature data stored in RAM 13.

On the other hand, if it is determined that the order for performing the cycle of printing the image on the paper is recieved by CPU 11 at step S2, the temperature in the register is compared with lower limit temperature Tb to determine whether the electric motor is driven or the temperature of the electric motor is decreased, at step S6. If the temperature in the register is lower than lower limit temperature Tb so that it is determined that the temperature in the register still is lower than the upper limit temperature Ta after the cycle of printing, the operation of the cycle of printing is performed, at step S7. Then, at step S8, the time for performing the cycle of printing is converted into the increased value of the temperature and updated in the temperature register. If the temperature in the register is higher than lower limit temperature Tb, the temperature is made to be dropped. Then, it is checked whether or not the operation of resting the electric motor is being performed at step S9. If the operation of resting the electric motor is being performed, the electric motor is in the resting state until the temperature of the electric motor is decreased and step S6 is performed again. If the operation of resting the electric motor is not being performed, the timer transfers the interrupt request to CPU 11 so that the operation of resting the electric motor is being performed and sets a flag for resting the electric motor to one at step S10.

Figure 6:
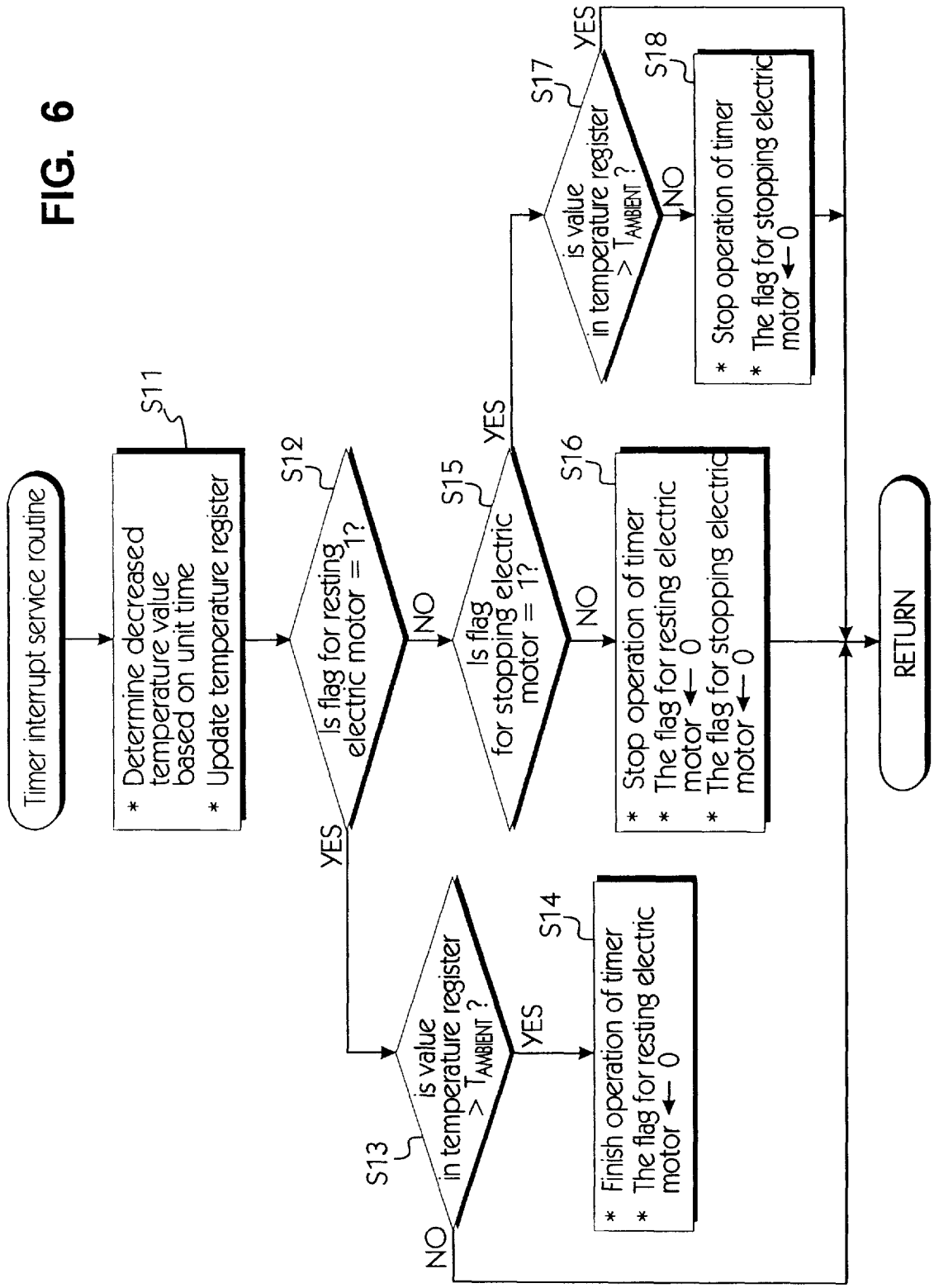
FIG. 6 is a flow chart showing a process of processing information for a decreased temperature at an every unit time in a timer interrupt service routine according to the present invention.

FIG. 6 is a flow chart showing a process of processing information for a decreased temperature at every passage of a unit time in a timer interrupt service routine according to the present invention. The unit time is converted into the decreased temperature value of the electric motor, that is, the decreased temperature value is determined based on the unit time, and the result is stored in the temperature register at step S11. Then, it is checked whether or not the operation of resting the electric motor is being performed, at step S12. If the operation of resting the electric motor is being performed, the temperature in the register is compared with the lower limit temperature Tb at step S13. If the temperature in the register is larger than the lower limit temperature Tb, the operation of resting the electric motor must continue. Therefore, the CPU 11 finishes the printing to operate timer 17.

In step S13. if the temperature in the register is equal to or lower than the lower limit temperature Tb, it means that the temperature of the electric motor is sufficiently decreased. Therefore, CPU 11 stops the operation of the motor and the flag indicating resting of the electric motor is initialized, that is, the flag is set to zero, at step S14.

If the flag indicating resting of the electric motor is not set to a value of one at step S12, it is checked whether or not the operation of stopping the electric motor is performed, at step S15. If the operation of stopping the electric motor is not performed, it means that the operation of resting the electric motor is performed. Therefore, the operation of timer 17 is stopped and the flags for resting and stopping the electric motor are initialized at step S16.

If the operation of the electric motor is stopped at step S15, the temperature value in the register is compared with the initial value $T_{ambient}$ at step S17. If the temperature value in the register is larger than the initial value $T_{ambient}$, the printing is finished to check the decreased temperature. If the temperature value in the register is equal to or smaller than the initial value $T_{ambient}$, it means that the temperature of the electric motor is at the initial condition. Accordingly, CPU 11 need not calculate the decreased temperature of the electric motor. Therefore, CPU 11 stops the operation of the motor and the flag, for stopping the operation of the electric motor is initialized, at step S18.

As described above, since the printing is controlled according to the temperature of the electric motor, the temperature of tile electric motor must be held between the upper limit temperature and the lower limit temperature. While the present invention has been described with reference to a printer, it will be understood that the present invention can be applied to other apparatus having an electric motor, for example a scanner or a copier.

The method for controlling the electric motor of the present invention does not require a heat radiator or a temperature sensor to control the temperature of the electric motor. Therefore the manufacturing cost of a printer, a scanner, a copier, or a multifunctional apparatus can be reduced.

Furthermore, since the operating period of the electric motor can be controlled to prevent the temperature of the electric motor from increasing, parts of the apparatus can be prevented from being deformed due to heat, resulting in improving the reliance of an apparatus which incorporates the present invention, including a printer, a scanner, a copier, or a multifunctional apparatus.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A method for controlling the temperature of an electric motor in a device, comprising the steps of:

setting a temperature register value to the temperature of the motor at an initial time;

repeatedly, at each passage of a unit time, determining said temperature based on the temperature register value and resetting said temperature register value to the determined value;

waiting until an order is received to perform a printer motor cycle and if said order is received, then:
  if said temperature register value is not lower than a predetermined lower limit temperature, then waiting a predetermined delay time; then,
  performing said printer motor cycle, determining an increased value of the temperature of the motor based on the temperature register value and the time of said printer motor cycle, and resetting the temperature register value to said increased value; and proceeding again to said step of waiting until an order is received.

2. The method of claim 1, where said lower limit is determined such that performing a printer motor cycle when the temperature of said motor is said lower limit temperature results in an increased value of said motor temperature which is less than or equal to a predetermined upper limit temperature, such that operation of the motor above said upper limit temperature results in degraded performance of the motor.

3. The method of claim 2, where said predetermined delay time is determined from the upper limit temperature, the lower limit temperature and the ambient temperature of the device.

4. The method of claim 1, further comprising the step of:
said initial temperature being determined by measuring the ambient temperature of the device.

5. The method of claim 1, further comprising that said printer motor cycle is part of the process of moving a printer head.

6. The method of claim 1, further comprising that said printer motor cycle is part of the process of moving a line scanner.

7. The method of claim 1, further comprising that said printer motor cycle is part of the process of turning a roller in an office multifunctional apparatus.

8. A method for controlling the temperature of an electric motor in a device, comprising the steps of:

setting a temperature register value to the temperature of the motor at an initial time;

repeatedly, at each passage of a unit time, determining said temperature based on the temperature register value and resetting said temperature register value to the determined value;

waiting until an order is received to perform a printer motor cycle and if said order is received, then:
  if said temperature register value is not lower than a predetermined lower limit temperature, then waiting until said temperature register value is lower than a predetermined lower limit temperature; then,
  performing said printer motor cycle, determining an increased value of the temperature of the motor based on the temperature register value and the time of said printer motor cycle, and resetting the temperature register value to said increased value; and proceeding again to said step of waiting until an order is received.

9. The method of claim 8, where said lower limit is determined such that performing a printer motor cycle when the temperature of said motor is said lower limit temperature results in an increased value of said motor temperature which is less than or equal to a predetermined upper limit temperature, such that operation of the motor above said upper limit temperature results in degraded performance of the motor.

10. The method of claim 8, further comprising the step of:

said initial temperature being determined by measuring the ambient temperature of the device.

11. The method of claim 8, further comprising that said printer motor cycle is part of the process of moving a printer head.

12. The method of claim 8, further comprising that said printer motor cycle is part of the process of moving a line scanner.

13. The method of claim 4, further comprising that:

said lower limit temperature, Tb, is determined using the formula:

$$Tb=T_{max} \times (1-\exp(-((t_1-\Delta t_r)/\tau_r))) + T_{ambient}$$

where $T_{ambient}$ is the ambient temperature, $T_{max}$ is the maximum temperature rise of the temperature of the electric motor running at 100% duty starting at temperature $T_{ambient}$, t1 is a determined time for the electric motor to increase from the ambient temperature to the lower limit temperature from the initial temperature at 100% duty, $\Delta t_r$ is a determined time for the temperature of the electric motor to increase from the lower limit temperature to an upper limit temperature, and $\tau_r$ is a determined index of the temperature increase of the electric motor.

14. The method of claim 1, further comprising that:

said increased temperature temperature value is determined using the formula:

$$T_{increased}=T+T_{max}\exp(-t_{cycle}/\tau_r),$$

where $T_{increased}$ is the increased temperature, T is said temperature register value before resetting, $T_{max}$ is the maximum temperature rise of the temperature of the electric motor running at 100% duty starting from an ambient temperature, $t_{cycle}$ is said time of said printer motor cycle, and $\tau_r$ is a determined index of the temperature increase of the electric motor.

15. The method of claim 2, further comprising that said upper limit temperature is determined using the formula:

$$Ta=T_{max} \times (1-\exp(-(t_1/\tau_r))) + T_{initial}$$

where Ta is said upper limit temperature, t1 is a determined time for the electric motor to increase from the ambient temperature to the lower limit temperature from the initial temperature at 100% duty, $\tau_r$ is a determined index of the temperature increase of the electric motor, and $T_{initial}$ is said temperature of said electric motor at said initial time.

16. The method of claim 8, further comprising that:

said lower limit temperature, Tb, is determined using the formula:

$$Tb=T_{max} \times (1-\exp(-((t_1-\Delta t_r)/\tau_r))) + T_{ambient}$$

where $T_{ambient}$ is the ambient temperature, $T_{max}$ is the maximum temperature rise of the temperature of the electric motor running at 100% duty starting at temperature $T_{ambient}$, t1 is a determined time for the electric motor to increase from the ambient temperature to the lower limit temperature from the initial temperature at 100% duty, $\Delta t_r$ is a determined time for the temperature of the electric motor to increase from the lower limit temperature to an upper limit temperature, and $\tau_r$ is a determined index of the temperature increase of the electric motor.

17. The method of claim 8, further comprising that:

said increased temperature temperature value is determined using the formula:

$$T_{increased}=T+T_{max}\exp(-t_{cycle}/\tau_r),$$

where $T_{increased}$ is the increased temperature, T is said temperature register value before resetting, $T_{max}$ is the maximum temperature rise of the temperature of the electric motor running at 100% duty starting from an ambient temperature, $t_{cycle}$ is said time of said printer motor cycle, and $\tau_r$ is a determined index of the temperature increase of the electric motor.

18. The method of claim 9, further comprising that said upper limit temperature is determined using the formula:

$$Ta=T_{max} \times (1-\exp(-(t_1/T\tau_r))) + T_{initial}$$

where Ta is said upper limit temperature, t1 is a determined time for the electric motor to increase from the ambient temperature to the lower limit temperature from the initial temperature at 100% duty, $\tau_r$ is a determined index of the temperature increase of the electric motor, and $T_{initial}$ is said temperature of said electric motor at said initial time.

* * * * *